April 15, 1969

F. J. MOORE

SIMPLIFIED CONSTRUCTION FOR DOOR LATCH OPERATING MECHANISM

Original Filed Oct. 22, 1962

Re. 26,564

INVENTOR.

FRANCIS J. MOORE

BY John W. Adams

ATTORNEY

United States Patent Office

Re. 26,564
Reissued Apr. 15, 1969

26,564

SIMPLIFIED CONSTRUCTION FOR DOOR LATCH OPERATING MECHANISM

Francis J. Moore, Minneapolis, Minn., assignor to Schlage Lock Company

Original No. 3,203,719, dated Aug. 31, 1965, Ser. No. 232,110, Oct. 22, 1962. Application for reissue Mar. 16, 1966, Ser. No. 541,889
Int. Cl. E65c *1/12*
U.S. Cl. 292—167 11 Claims

Matter enclosed in heavy brackets [ ] appears in the original patent but forms no part of this reissue specification; matter printed in italics indicates the additions made by reissue.

*ABSTRACT OF THE DISCLOSURE*

*A spring projected door latch is actuated through a link member by an arm projecting from a cylindrical member mounted within a hollow spindle rotatable in clamping elements on the sides of the door. Inner and outer handle elements and shroud members are fixed to the spindle with the shroud members covering the clamping elements.*

This invention relates generally to improvements for a door latch operating mechanism and more particularly to a simplified actuating device for the operation of a door latch mechanism.

In the past, various door latch operating mechanisms have been developed wherein a normally extending door latch element is retracted to an unlatching position by a cooperating rotatable handle member. The majority of these mechanisms have included a complicated linkage in order to convert the rotary motion applied to the handle to a linear motion necessary to move the door latch element from its normal extended position. My invention is primarily devoted to a unique simple linkage arrangement wherein a rotatable element is provided with a cooperating door latch engaging arm such that the arm will oscillate and convert the purely rotative movement of the handle to linear motion necessary to move the door latch element into a retracted position.

It is a specific object of my invention to provide a door latch actuating mechanism wherein a pair of door engaging clamp elements are arranged on either side of a door cooperating to provide a pair of spaced-apart bearing openings for a rotatable element and wherein an arm mounting element closely cooperates with said rotatable element and to further provide an arm extending from said mounting element to a door latch for retraction thereof.

It is a further specific object of my invention to provide a means of self-centering said rotative element such that said element will be returned to a normal first position after rotation thereof, thus allowing the door latch to be returned to a normal extended position.

It is a further specific object of my invention to provide a pair of individual door clamping elements to be mounted on either side of a door with connection means therebetween to clamp the door therebetween, and further to provide said connecting means of a variable length such that my door latch element may be used on doors of any width.

It is a further specific object to provide door-engaging means on one of said door clamping means to prevent rotation thereof relative to said door.

It is a further specific object of my invention to provide a handle clamping means on one end of said rotatable element by providing a slot extending longitudinally from one end of said rotatable element and further providing tightening means extending through said slot associated with a handle member to exert a force on the inner surface of said rotatable means to hold said handle thereon.

These and other objects and advantages of my invention will more fully appear from the following description made in connection with the accompanying drawing, wherein like reference characters refer to the same or similar parts throughout the several views, and in which.

Figure 1:
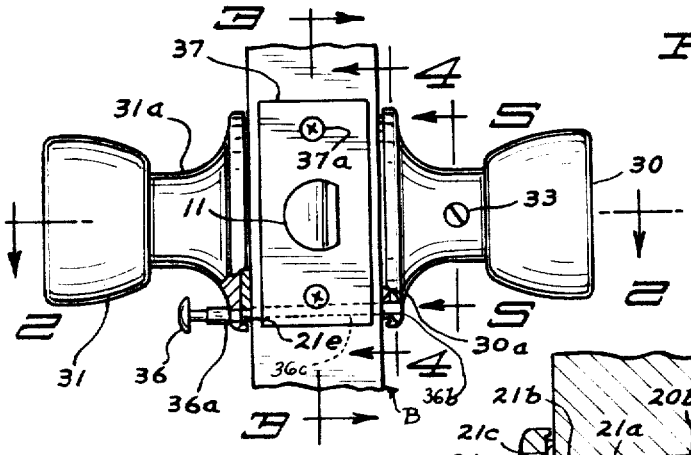
FIGURE 1 is a partial side elevational view of a door with my door latch mechanism attached thereto.

In my invention for a door latch operating mechanism, I provide a door latch element 11 arranged through an opening A formed in the narrow edge of a door B and a door latch operating mechanism generally designated C arranged to pass through an opening D cut into the surface of said door B to engage the latch element 11 for movement thereof.

The latch element 11 includes a tubular hollow member 12 received into the door opening A and having the inwardly disposed end 12a enclosed with a slot 12b formed therein. The latch element 11 comprises, in the form shown, a protruding end to be received in a stationary door stop element (not shown) such as would be attached to a door jamb. In a conventional method, the latch element 11 is provided with a substantially larger portion 11a to be slidably received into the hollow portion of the casing 12 and bear thereon during reciprocal motion therein. An actuating arm member 11b extends rearwardly of said enlarged portion 11a and is rotatably attached thereto as by the pin 11c so as to extend through the casing slot 12b in the casing end 12a. A spring member 13 is interposed between the enlarged portion 11a of the latch member 11 and the casing end 12a to maintain said latch element 11 in a normally extended position, as shown in FIGUR E2.

Figure 3:
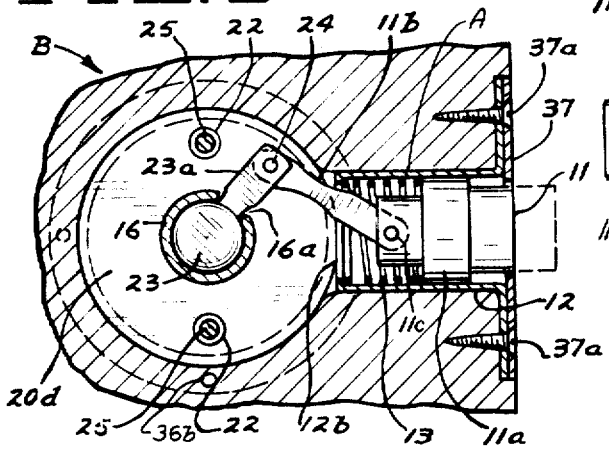
FIGURE 3 is a vertical section taken substantially along line 3—3 of FIGURE 1.

To actuate said latch element, I provide an elongated rotatable hollow member 16 arranged to pass through the center of the latch door opening D as by providing a pair of door-engaging clamp elements 20 and 21 having central openings 20a and 21a therein. In the form shown, I provide a slot 16a extending from one end of said hollow member at least to a point normally lying within the opening D of the door B. An arm mounting member 23 is slidably received within the hollow portion of the rotatable member 16 and, in the form shown, a pair of arm members 23a extend from the periphery of the arm mounting member 23 through the slot 16a such that the arms 23a will move in corresponding relation to the rotatable member 16. The outermost ends of said arms 23a are connected to the rearward extending end of the operating arm 11b of the door engaging element 11 as by providing an aligned opening 23b therein and a pin 24 passing therethrough. Thus upon rotation of said rotatable member 16, this rotary motion will be transmitted through the extending arms 23a and attached operating link 11b producing linear movement of the latch element 11, as best shown in FIGURE 3. Upon release of this force, the spring member 13, of course, will move the latch element 11 back to its normal extended position.

In the form shown, the door engaging clamp elements 20 and 21 include substantially short arcuate sections 20b and 21b received within the opening D formed in the door B. A shoulder portion 20c and 21c of slightly larger diameter than said arcuate section 20b and 21b is provided at one end of said section to limit the engagement of the clamping elements 20 and 21 into said door opening B. The innermost extending ends of clamps 20 and 21 include a flat closure portion 20d and 21d, with a central opening 20a and 21a formed therein providing a bearing opening for the hollow rotatable member 16.

Figure 2:
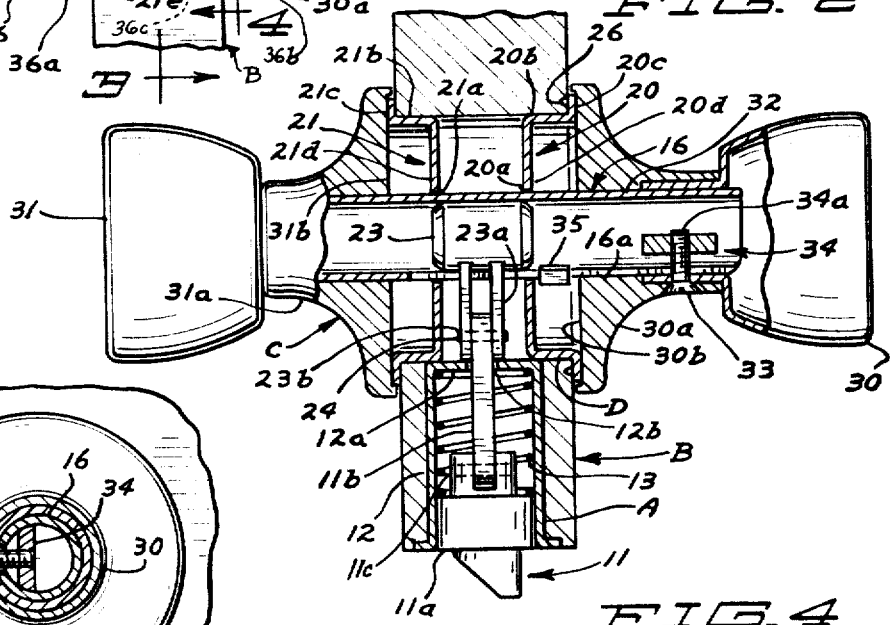
FIGURE 2 is a partial horizontal section view taken substantially along the line 2—2 of FIGURE 1.

Clamping force is exerted on the door member by providing a pair of cooperating openings 22 in each of said door engaging elements and wherein the openings 22 on one of said elements is provided with internal threads to receive a screw 25 or other threaded fastening means extending from the other of said clamp elements. Engaging said screw element 25 with the threaded opening of the other clamp element will produce a clamping force on the door contained between the shoulder portions 20c and 21c of the respective clamp elements. Further, in the form shown one of said clamp elements is provided with at least one digging or clenching element 26, as best shown in FIGURE 2, which will be drawn into the material of the door to prevent relative rotation of the clamp elements 20 and 21 thereon.

Figure 4:
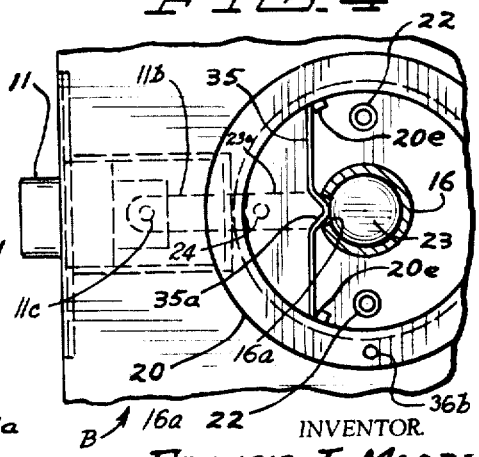
FIGURE 4 is a vertical section taken substantially along line 4—4 of FIGURE 1.

As best shown in FIGURE 4, a centering spring element 35 is provided within the clamping element 20 and has a slot engaging offset center portion 35a to be received into the slot 16a of the rotatable element 16. The end portions of said spring element 35 are, in the form shown, nested against inwardly protruding ears 20e formed in the inner wall of said clamp 20. The spring element 35 produces a force on the rotatable element 16 such that upon release of rotative force on said element, the offset portion 35a will center the slotted portion 16a of the rotatable element 16 therearound.

Figure 5:
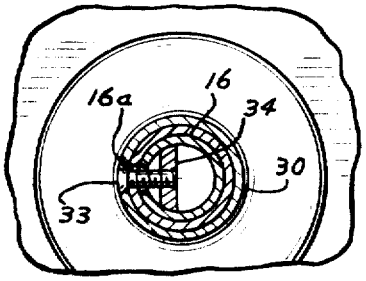
FIGURE 5 is a vertical section taken substantially along line 5—5 of FIGURE 1.

A pair of handle elements 30 and 31 are provided on the ends of said rotatable member 16 and in the form shown, the handle element 31 is firmly attached to said rotatable element 16 as by soldering or similar means. The other of said handle element 30 is arranged to be removably affixed to the other end portion of the rotatable element such as by providing said handle with a central passage 32 therein of slightly larger diameter than the rotatable element 16. This handle element 30 is secured to the rotatable element 16 by providing a screw member 33 extending radially into said passage 32 and providing on the end thereof a handle locking element 34 with a threaded passage 34a therein and, as best shown in FIGURE 5 [.], [The] *the* locking element 34 has, in the form shown, a width slightly smaller than the internal diameter of the rotatable element 16. To mount the handle member 30, the screw 33 is arranged to pass longitudinally into the slot 16a of the rotatable member 16 and the locking element 34 is arranged to lie in the hollow center portion thereof. By tightening the screw 33, the locking element 34 is drawn into contact with the interior of the rotatable element 16 and produces a locking force thereon.

In the form shown, each of the handle elements 30 and 31 is provided with a shroud member 30a and 31a such that when the handles are slid into proper position on the door, the bottom-most portion of the shroud will entirely cover and bear upon the shoulder portions 20c and 21c of the clamp elements 20 and 21. A shallow recess 30b and 31b is provided on the endmost portion of the shrouds 30a and 31a respectively and, in the form shown, is slightly larger than the diameter of said shoulder portions 20c and 21c so as to completely surround the clamping elements 20 and 21.

As shown in FIGURE 1, one of the handle elements 31 is provided with a locking device 36 extending through an opening 36a in the shroud member 31a and when in a locked position wil be received into an opening 21e formed in the shoulder of the clamping element 21. Further, as shown in FIGURES 1 and 3, a cover plate 37 is provided to overlie the latch element 11 and hold the same therein by providing screws 37a or other fastening means to be received into the door B and hold the plate thereon.

Although I choose to actuate the door engaging latch 11 with a pair of arms 23a extending from an arm mounting 23 contained within the hollow portion of the rotatable element 16, it should be obvious that my device would work equally as well if similar linkage means such as a clamp means were provided to surround and move in conjunction with said rotatable element 16. I have chosen the method I describe because of the great convenience in assembly as it is only necessary to slide my hollow element 16 over the arm mounting member 23 which has been positively captured therein. This, of course, eliminates the necessity of any clamping means which would require tightening which, of course, would be difficult when operating in the confined area available within a door.

In operation of my invention, it is, of course, necessary to drill a small opening A in the edge of a door B and a substantially larger opening D communicating therewith through the side surfaces of the door B. The latch element 11 including the extending arms 23a and arm mounting member 23 is placed therein and secured thereto by the plate 37 and screws 37a. Clamping elements 20 and 21 are arranged on either side of the door B through the large opening D and clamping force is applied thereto by tightening the screws 25 in the threaded openings 22. In tightening said screws 25, the digging element 26 is drawn into the material of the door B, thus preventing rotation of the clamps 20 and 21 relative to the door. Rotative element 16 is placed in the opening in one of the clamping elements and pushed therethrough such that the arm mounting element 23 will be received therein and the arms 23a will extend through the slot 16a. Handle element 30 is mounted thereon and my invention is ready for use. When the handles are rotated in either direction, the latch element is, of course, retracted and the door may be opened. Upon release of the rotary force the spring element 13 returns the latch to a normally extended position and the attached handles and rotative element 16 to a normal position. To insure positive return of the rotative element 16 and the handles to a position where the lock 36 may be employed, the spring member 35 is provided. In normal latched position, the angular offset portion 35a of the spring 35 urges against the sides of the slot 16a maintaining the rotative element 16 in normal position. When the handles are turned, the offset portion 35a is partially displaced from the slot 16a but an increase in force, of course, exists resulting from this deflection. Therefore, upon release of the rotary force the spring 35 tends to return to its normal position and as a result cams the slot 16a to follow therearound to the normal first position.

In the operation of my device, it should be noted that I provide an additional safety feature so that no one such as a small child could be accidentally locked within a room. As shown in FIGURE 1, I provide an opening 36b in the shroud 30a and clamping element 20, which opening will be aligned with the lock 36 and lock opening 36a and inter-connected thereto as by the opening 36c formed in the door. The operation of this opening is such that a small wire or similar probing element may be pushed therethrough and force the lock element 36 out of the opening 21e into an unlocked position, therefore allowing the user to open the door from the opposite side.

From the construction of my door latch operating mechanism as herein described, it is obvious that this mechanism may be used on many types of doors irregardless of their thickness and may be mounted such that the lock element may be on either side of the door.

It may be seen that I have invented a door latch actuating mechanism having a simplified unique construction which provides ease of assembly and insures positive action for operating a door latch.

It will, of course, be understood that various changes may be made in the form, details, arrangement and proportion of parts without departing from the scope of my invention, which generally stated consists in the subject matter set forth in the appended claims.

I claim:

1. A spring door latch mechanism comprising a movable latch element adapted to be mounted on a door, spring means normally maintaining said movable latch element in extended latching position, an elongated hollow rotatable member adapted to be mounted *to extend through* [on] a door and having a longitudinally disposed assembly slot extending from one end thereof *outside said door* at least into the door surrounded portion thereof, *a handle member mounted on said elongated hollow rotatable member around said one end thereof,* means adapted to be mounted on said door for journaling said rotatable member for stabilized rotation on a fixed axis, an arm-mounting member slidably received within the hollow portion of said rotatable member to permit assembly in interfitted relation of the mounting and rotatable members, an arm fixed to said arm-mounting member for oscillation by said rotatable member, *and* means connecting said arm to said movable latch element to retract the same against said spring when said rotatable member is rotated [and handle means connected with said rotatable member for facilitating rotation thereof].

2. A spring door latch mechanism comprising a movable latch element adapted to be mounted on a door, spring means normally maintaining said movable latch element in extended latching position, an elognated hollow rotatable member adapted to be mounted *to extend through* [on] a door and having a longitudinally disposed assembly slot extending from one end thereof *outside said door* at least into the door surrounded portion thereof, *a handle member mounted on said elongated hollow rotatable member around said one end thereof,* a pair of clamping elements adapted to be placed on either side of a door for clamping therebetween and having a bearing opening therein to provide spaced bearing support for said rotatable member for rotation on a fixed axis, an arm-mounting member slidably received within the hollow portion of said rotatable member to permit assembly in interfitted relation of the mounting and rotatable members, an arm fixed to said arm mounting member for oscillation by said rotatable member, *and* means connecting said arm to said movable latch element to retract the same against said spring when said rotatable member is rotated [and handle means connected with said rotatable member for facilitating rotation thereof].

3. A spring door latch mechanism comprising a movable latch element adapted to be mounted on a door, spring means normally maintaining said movable latch element in extended latching position, an elongated hollow rotatable member adapted to be mounted on a door and having a longitudinally disposed assembly slot extending from one end thereof at least into the door surrounded portion thereof, means adapted to be mounted on said door for journaling said rotatable member for stabilized rotation on a fixed axis, an arm mounting member receivable into the hollow portion of said rotatable member, an arm fixed to said arm mounting member and extending radially outward through said slot for oscillation by said rotatable member and limiting relative rotation between said rotatable member and said mounting member through abutment with the sides of said slot, means connecting said arm to said movable latch element to retract the same against said spring when said rotatable member is rotated, and handle means connected with said rotatable member for facilitating rotation thereof.

4. The structure as set forth in claim 3 and locking means to prevent rotation of said rotatable member.

5. The structure as set forth in claim 4 and spring means associated with said rotatable member for pivotally returning the same to a predetermined stationary position.

6. The structure as set forth in claim 4 and a positioning means cooperating with said assembly slot for camming the rotatable member into a predetermined stationary position.

7. The structure as set forth in claim 4, and safety unlocking means provided in aligned association with said locking means to prevent accidental locking thereof.

8. The structure as set forth in claim 4 and at least one of said handles having an opening therein to receive the rotatable element therein and having a locking member extending radially into said opening with a clamping member on the inner end thereof, said locking member receivable into the slot of said rotatable member to position the clamping member internally thereof when said handle means is placed thereover and locking said handle means thereon when said locking element is actuated forcing the clamping element into locking interference fit with said rotatable element.

*9. A door latch mechanism comprising a movable latch element adapted to be mounted on a door, an elongated hollow rotatable member adapted to be mounted on said door, means for operably interconnecting said latch element and said rotatable member, a clamping element mounted on the side of said door and having a central opening therein through which said rotatable member passes, a handle element, a shroud member, and means for fastening said shroud member and said handle element to said rotatable member in concentric fixed relation thereto with said shroud member covering said clamping element.*

*10. A door latch mechanism as in claim 9 in which a portion of said shroud member rotatably bears upon said clamping element.*

*11. A door latch mechanism as in claim 9 in which said shroud member is of a diameter at least as great as the diameter of said handle, and there is a portion of substantially lesser diameter between the ends of said shroud member and said handle element.*

References Cited

The following references, cited by the Examiner, are of record in the patented file of this patent or the original patent.

UNITED STATES PATENTS

| | | | |
|---|---|---|---|
| 4,229 | 10/1845 | Palmer | 292—167 |
| 2,803,957 | 8/1957 | George | 292—169 X |
| 3,072,427 | 1/1963 | De Vines | 292—336.5 X |
| 3,160,432 | 12/1964 | Crepinsek | 292—167 |
| 638,404 | 12/1899 | Smith | 292—167 |
| 2,160,301 | 5/1939 | Baume | 292—167 |
| 2,673,758 | 3/1954 | Schlage | 292—167 |
| 3,036,850 | 5/1962 | Schmid | 292—167 |

MARVIN A. CHAMPION, *Primary Examiner.*

J. R. MOSES, *Assistant Examiner.*